Dec. 31, 1963 W. H. HARBOR ETAL 3,115,963
RECORD MATERIAL FEEDING MECHANISM
Filed July 11, 1961 9 Sheets-Sheet 3
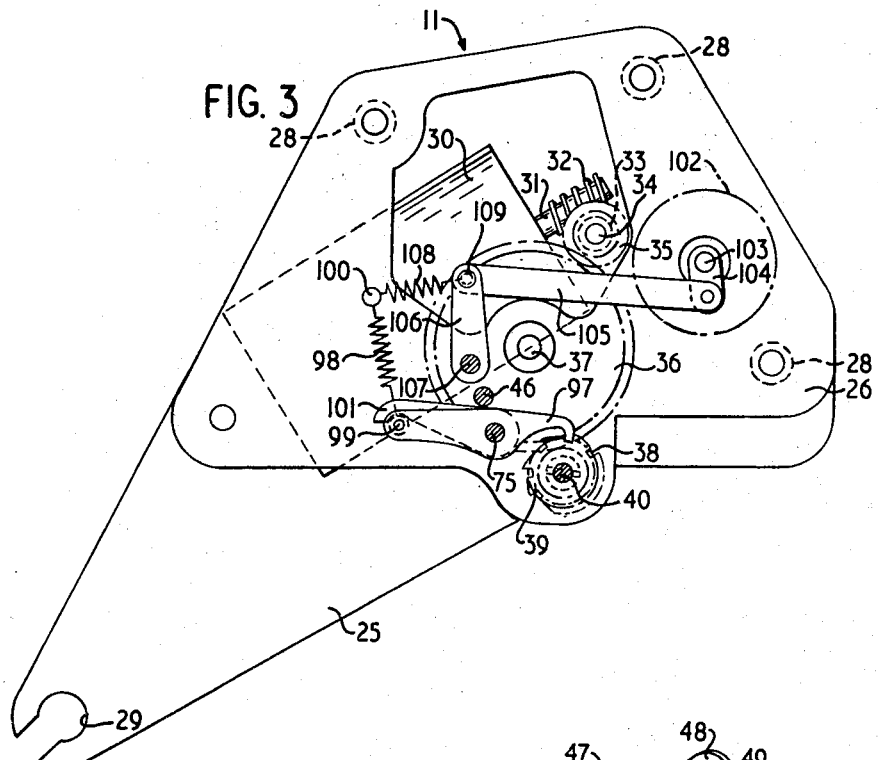
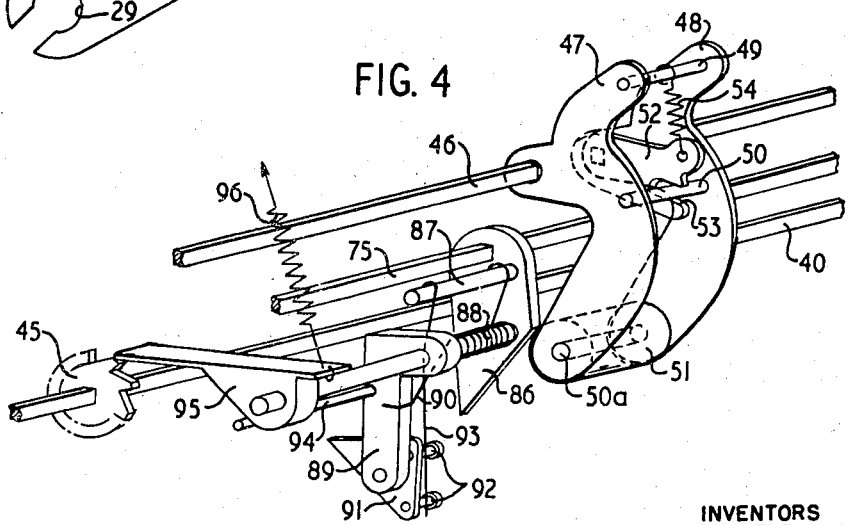
INVENTORS
WILLIAM HENRY HARBOR
ANTHONY ROBERT BURGE
BY *Louis A. Kline*
*Richard Van Buren*
THEIR ATTORNEYS

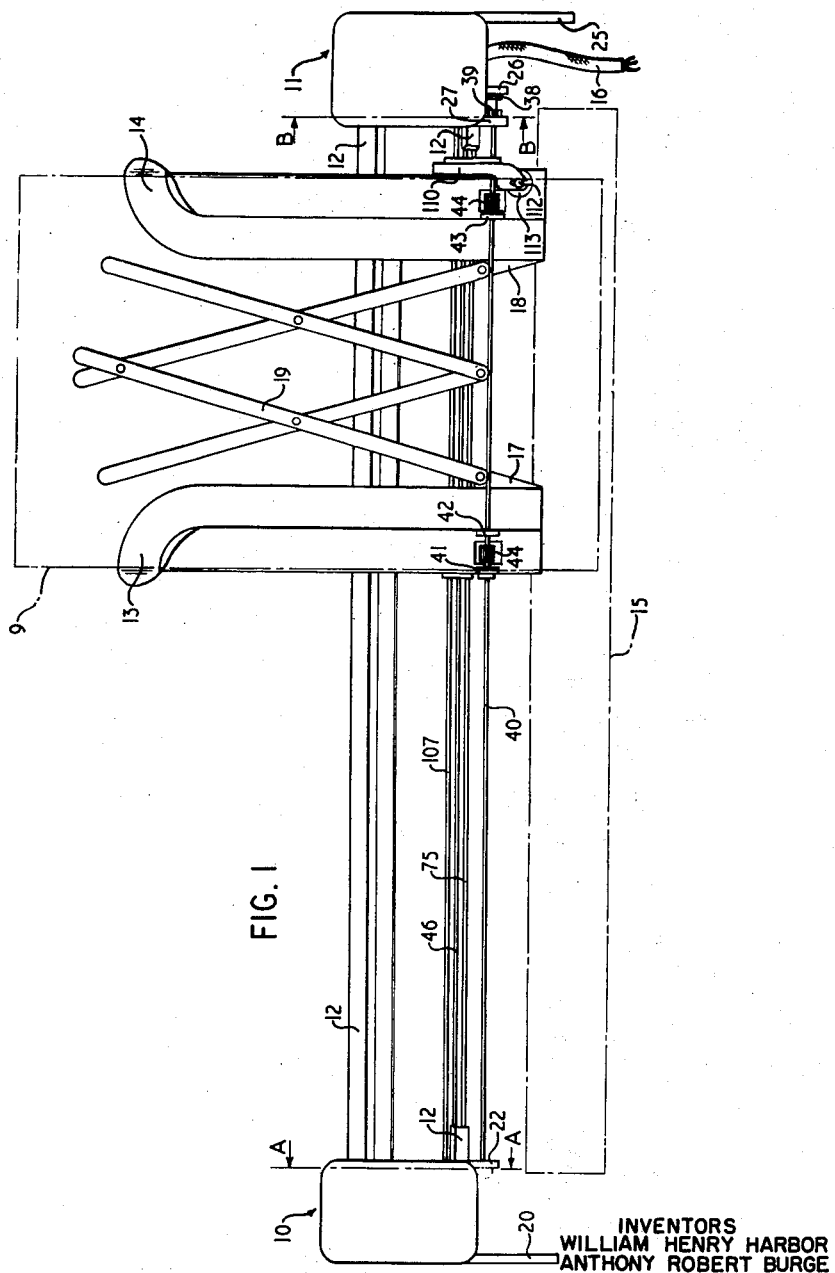

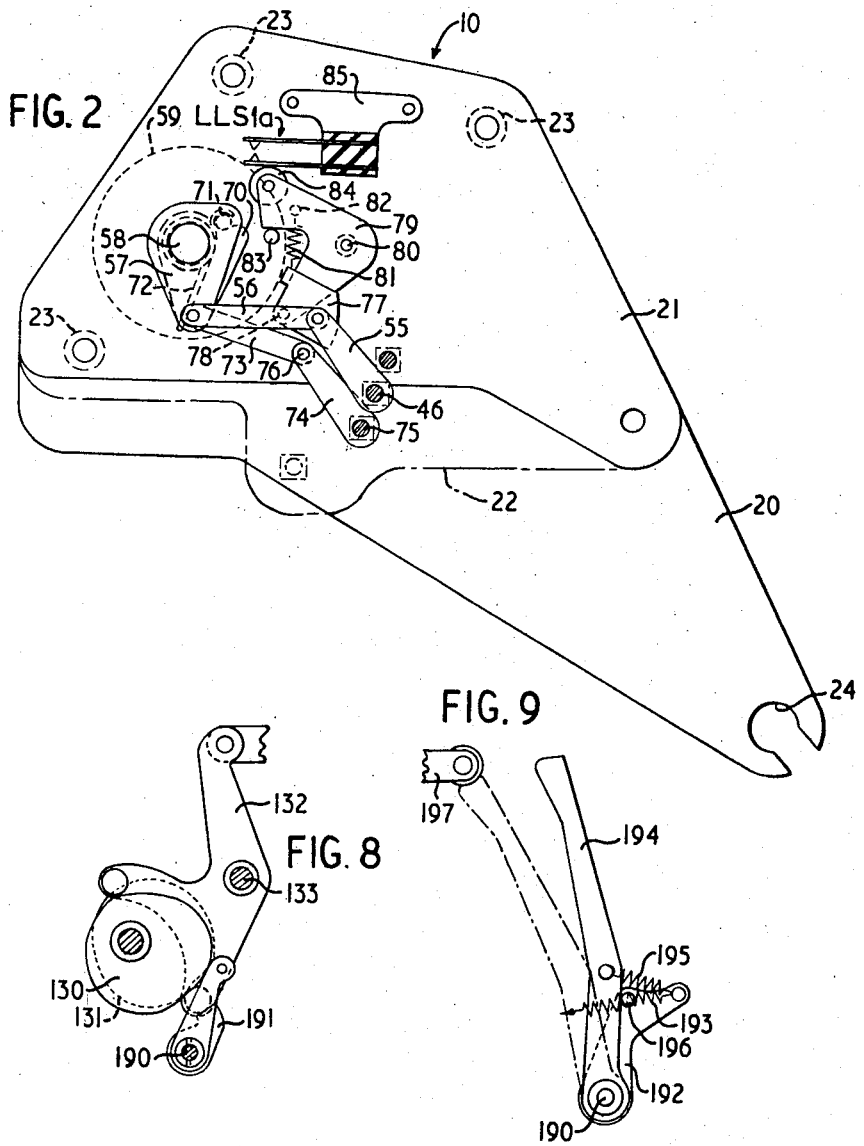

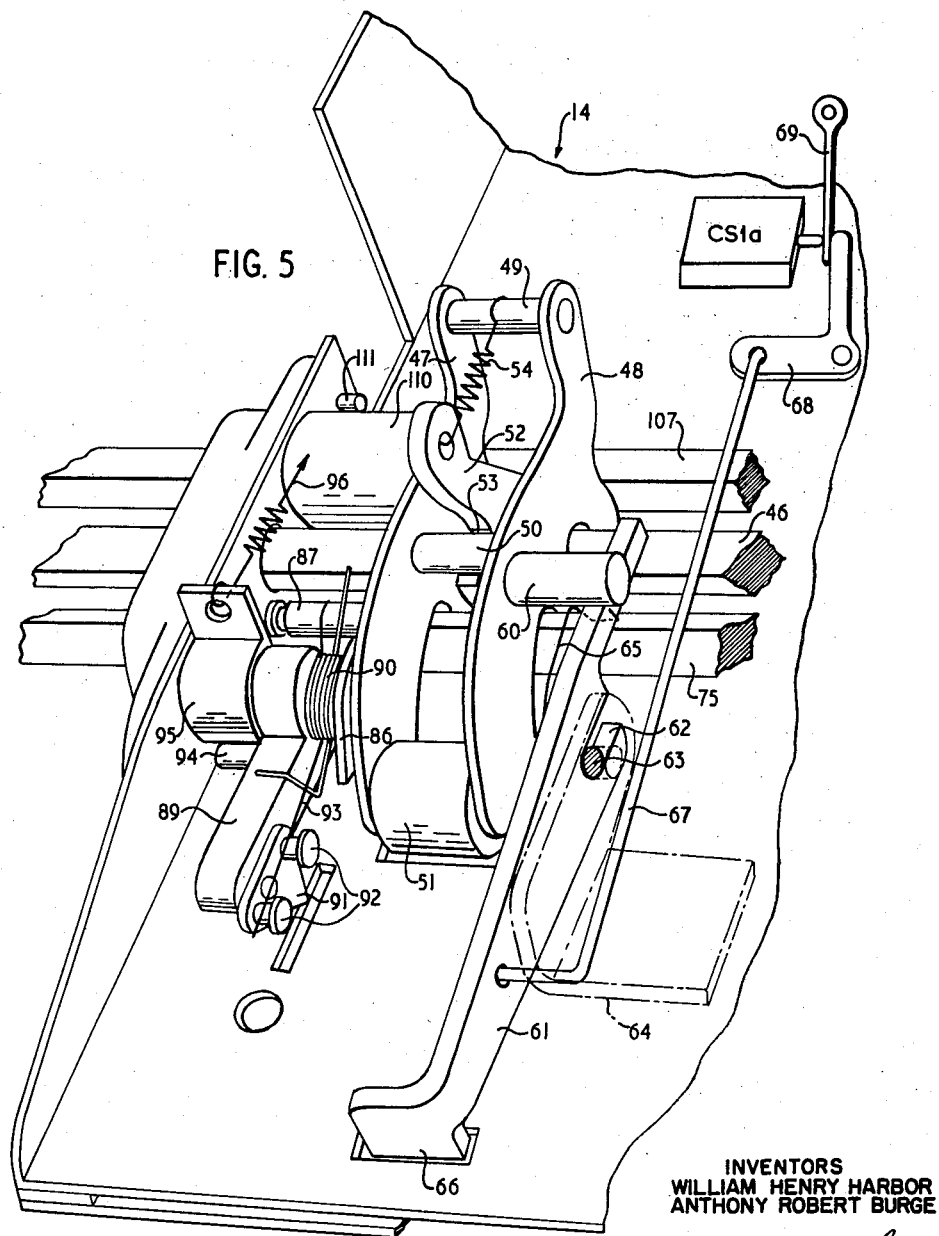

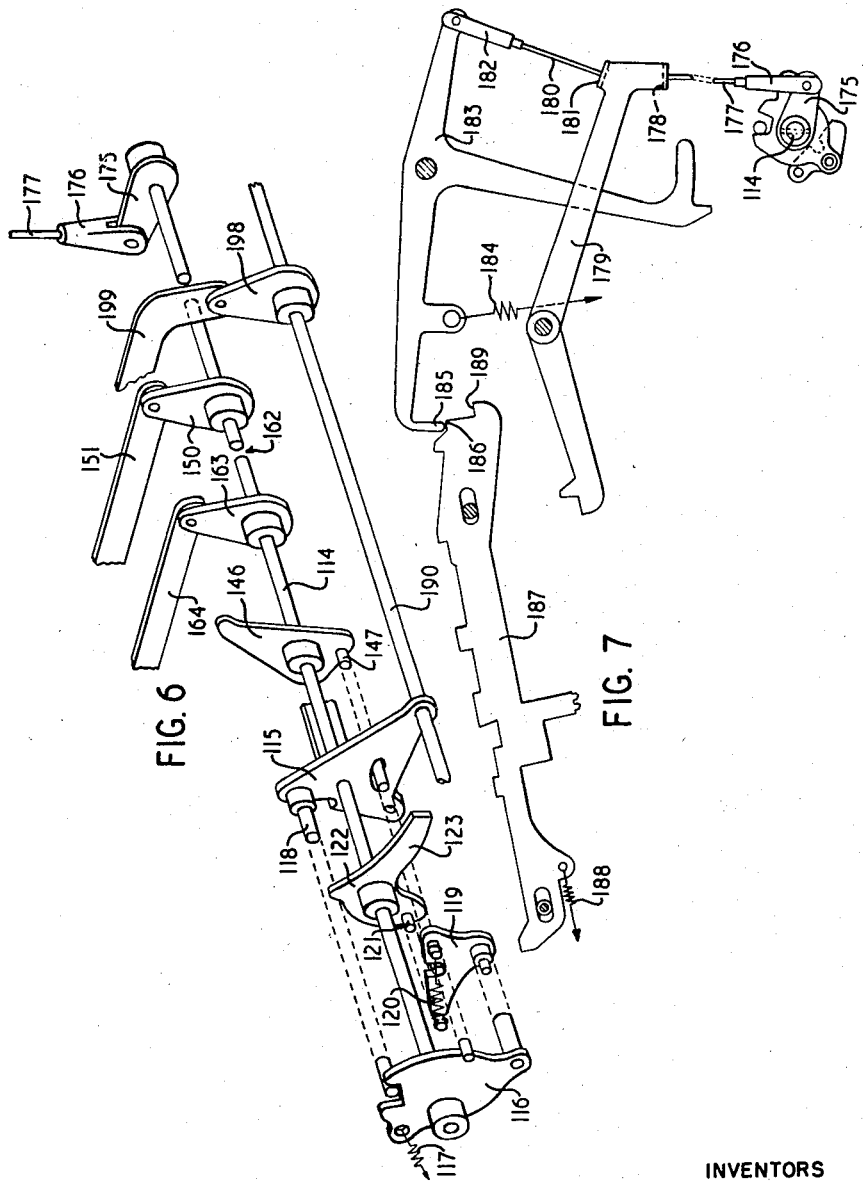

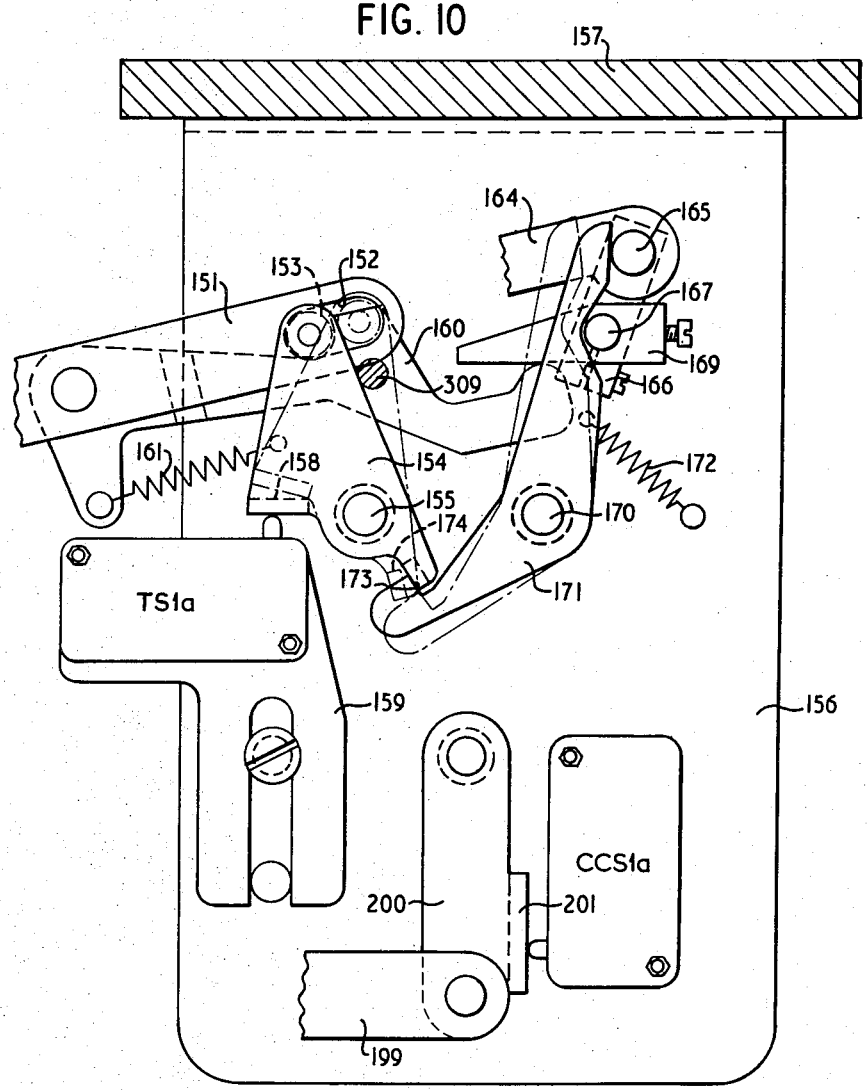

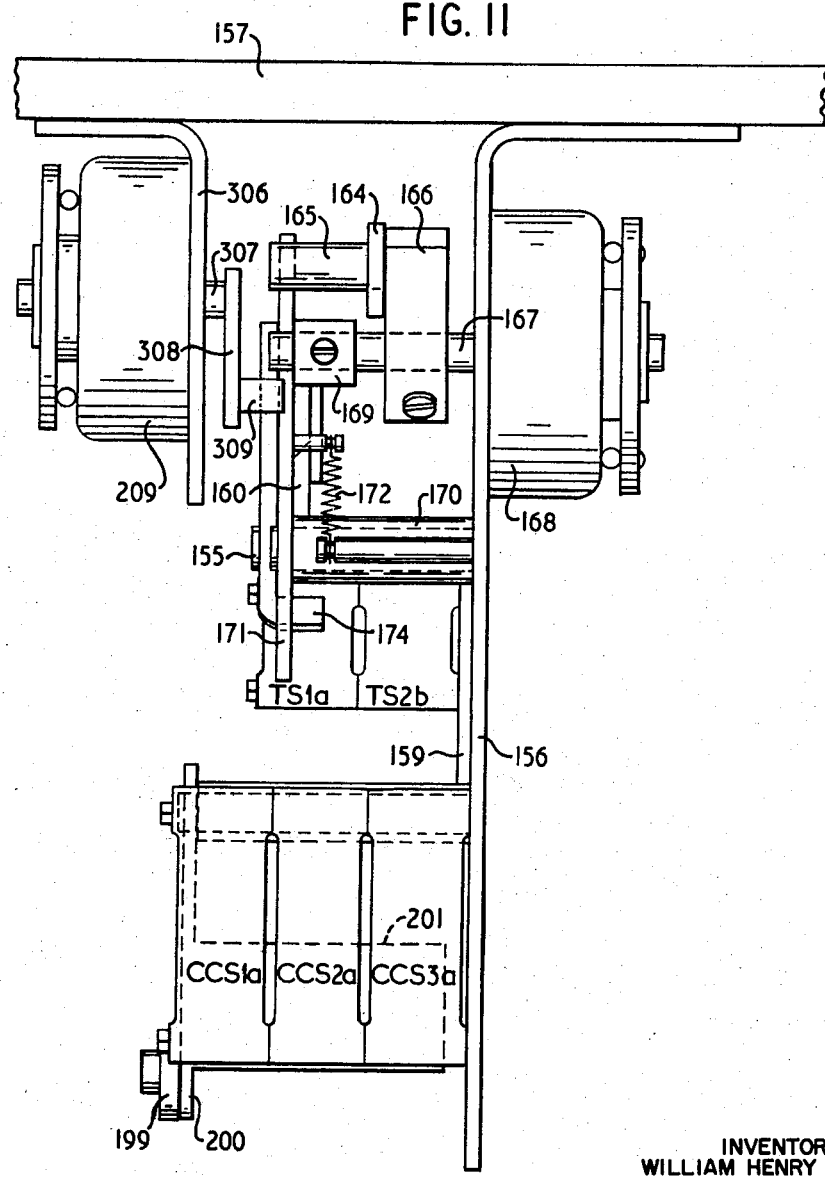

Dec. 31, 1963 W. H. HARBOR ETAL 3,115,963
RECORD MATERIAL FEEDING MECHANISM
Filed July 11, 1961 9 Sheets-Sheet 8

| | SALES LEDGER | | | | |
|---|---|---|---|---|---|
| NAME: A. Brown & Son | | | ACCOUNT No.: 5954 | | |
| ADDRESS: 59 High St. London | | | SHEET No.: 5 | | |

| DATE | DESCRIPTION | DEBIT | CREDIT | BALANCE | OLD BALANCE |
|---|---|---|---|---|---|
| | | | | | 52.10. 0 ˅ |
| 3 JUL 60 | GOODS | 7.15. 0 | | 60. 5. 0 | 60. 5. 0 ˅ |
| 10 JUL 60 | RETURNS | | 2. 3. 6- | 58. 1. 6 | |

INVENTORS
WILLIAM HENRY HARBOR
ANTHONY ROBERT BURGE

BY *Louis A. Kline*
*Richard Van Buren*

THEIR ATTORNEYS

INVENTORS
WILLIAM HENRY HARBOR
ANTHONY ROBERT BURGE

THEIR ATTORNEYS

United States Patent Office 3,115,963
Patented Dec. 31, 1963

3,115,963
RECORD MATERIAL FEEDING MECHANISM
William Henry Harbor, Edgware, and Anthony Robert Burge, Wallington, England, assignors to The National Cash Register Company, Dayton, Ohio, a corporation of Maryland
Filed July 11, 1961, Ser. No. 123,277
Claims priority, application Great Britain Sept. 28, 1960
5 Claims. (Cl. 197—127)

This invention relates to a record material feeding mechanism for use with an accounting or similar machine in which, on the introduction of a record member into a receiving receptacle, the record member is caused automatically to be fed and positioned to present a predetermined line at a printing station, and more particularly to mechanism of the kind adapted to be removably mounted on a travelling record material carriage of such machines for feeding record members, such as account cards, into a front-feed throat.

It is the main object of the present invention to provide such a mechanism with means for feeding and accurately arresting a record member introduced into the mechanism at the next available printing line as determined by the sensing of a mark made on the record member at the conclusion of the last printing operation, without the risk of damage to the record member when the mark is sensed.

Accordingly, the invention comprises a record material feeding mechanism for use with an accounting or similar machine in which, on the introduction of a record member into a receiving receptacle, the record member is caused automatically to be fed and positioned to present a predetermined line at a printing station, including a driving mechanism for driving the feeding mechanism for the record member, an arresting mechanism for the driving mechanism, a trigger device for sensing a line-positioning mark on the record member indicative of said predetermined line, and a control device for the arresting mechanism, the arrangement being such that the trigger device on sensing said mark causes the control device to be brought into engagement with the feeding mechanism to receive therefrom movement effective to actuate the arresting mechanism positively to arrest the feed mechanism when the record material is located at the said predetermined line.

The above, and other subsidiary features of the present invention as applied, by way of example only, to one manner of carrying it into effect, will now be described and are illustrated in the accompanying drawings.

FIGURE 1 is a front view of a line-finding attachment which is adapted to be detachably fitted to the carriage of an accounting, typewriting, or similar machine, and which includes a cooperating and relatively adjustable pair of card chutes for receiving sheet media such as account cards.

FIGURE 2 is a side elevation of mechanism contained within a left-hand assembly of the line-finding attachment as substantially taken along line A—A of FIGURE 1.

FIGURE 3 is a side elevation of mechanism contained within a right-hand assembly of the line-finding attachment as substantially taken along line B—B of FIGURE 1.

FIGURE 4 is an exploded rear perspective view of mechanism for initiating the arrest of the feed of the sheet media upon the sensing of a control indentation in the latter.

FIGURE 5 is an enlarged rear perspective view of the mechanism of FIGURE 4 assembled on one of the card chutes.

FIGURE 6 is a perspective view of part of a front feed throat opening and closing mechanism for the machine.

FIGURE 7 is a right side view of mechanism for controlling the opening and closing of the front feed throat.

FIGURE 8 is a right side view of part of mechanism for preventing operation of the machine when the front feed throat is open.

FIGURE 9 is a right side view of another part of the mechanism for preventing operation of the machine when the front feed throat is open.

FIGURE 10 is a right side view of a latching mechanism for latching certain electrical micro-switches in closed position.

FIGURE 11 is a rear elevation of the mechanism of FIGURE 10.

FIGURE 12 is a right side view of a clutch for the front feed throat as seen from the right-hand side of the machine.

FIGURE 13 is a right side view showing other elements of the clutch mechanism for the front feed throat.

FIGURE 15 is a facsimile of an account card.

*Description*

Figure 14:
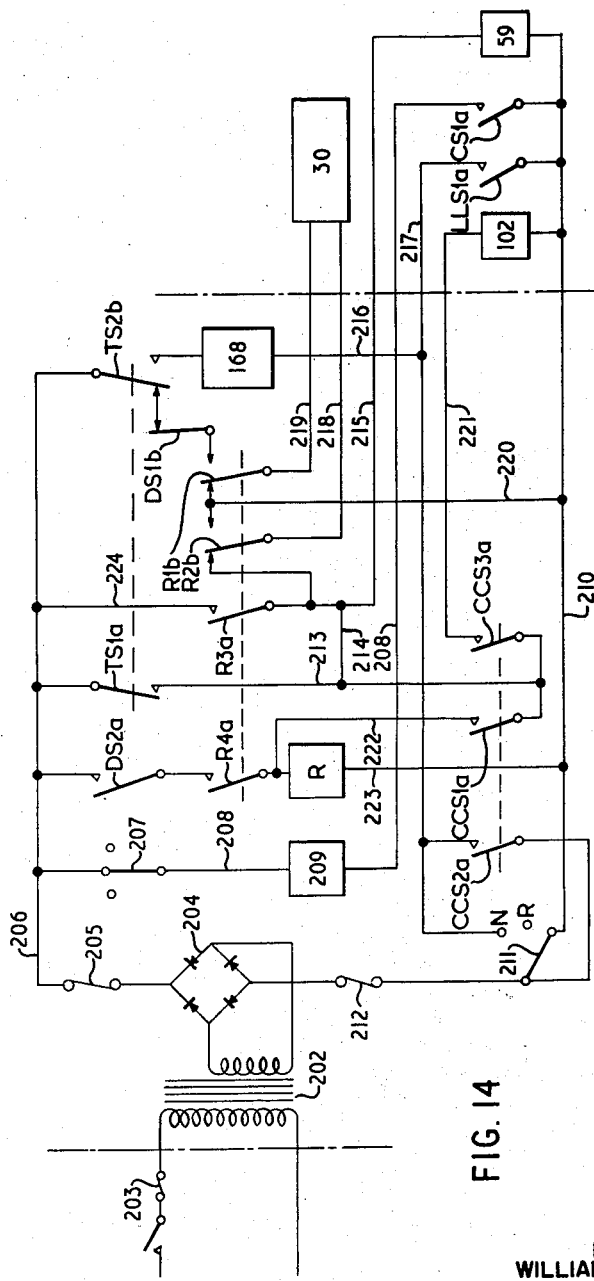
FIGURE 14 is an electrical circuit for controlling the operation of the line-finding attachment.

The line-finding attachment illustrated in FIGURE 1 has a left-hand assembly 10 and a right-hand assembly 11 joined together by cross bars 12, the cross bars slidably supporting a pair of card chutes 13 and 14, the chutes being lockable in any desired adjusted position by clamps (not shown) acting upon one of the cross bars 12. The chutes are located so that when the attachment is fitted on the carriage of a machine the lower ends of the chutes 13 and 14 are so related to a machine platen 15 that a card, such as indicated at 9, when fed into the chutes, descends to the front of the platen. Electrical components carried by the attachments are connected, over a cable 16 and plug and socket connections, to electrical control mechanism mounted beneath the rear of the machine. Ears 17 and 18 on the chutes 13 and 14 have mounted thereon the ends of an extensible trellis 19 for supporting an inserted account card across its width, and to facilitate its guidance in front of certain rotatable shafts to be described later.

The left-hand assembly 10 has an outer plate 20, an intermediate plate 21 (see FIGURE 2) and an inner plate 22, secured together in spaced apart relationship by three shouldered studs 23, the outer plate 20 having a downward and rearward extension terminating in a keyhole slot 24. The right-hand assembly 11 is also provided with an outer plate 25 (FIGURE 3) and intermediate plate 26, and an inner plate 27 (see FIGURE 1) secured together in spaced apart relationship by three shouldered studs 28, the outer plate 25 having a downward and rearward extension terminating in a keyhole slot 29. The end plates of the accounting machine carriage are each provided with a headed stud (not shown) flattened along one side projecting therefrom so that the slots in the plates 20 and 25 can be passed over the smaller diameters of the studs and then into the rounded portions of the slots so that, when the attachment is tilted into its operative position the said rounded portions are locked on the studs.

Mounted between the plates 25 and 26 is a reversible electric motor 30 (see also FIGURE 14), a shaft 31 of which is provided with a worm gear 32 meshing with a pinion (not shown) on a sleeve 33, rotatably mounted on a stud 34 secured in the plate 25, and which, through a slipping clutch (not shown) which may be of any suitable known kind, drives a pinion 35 meshing with a gear 36 rotatable on a stud 37 in the plate 26. The gear 36 also meshes with a pinion 38 coupled to a notched arresting and aligning disc 39, both being secured to the tenoned end of a square shaft 40 journalled in the plates 22

(FIGURES 1 and 2), 26 and 27 (FIGURES 1 and 3). The square shaft 40 is supported in lugs 41 and 42, and 43 of the chutes 13 and 14, respectively, and has provided thereon adjacent each chute a slidable feed roller 44 which partially projects through openings in the front walls of the chutes. Also slidably mounted on the square shaft 40 is a drive ratchet 45 (FIGURE 4) normally underlying a drive pawl 95 to be described later herein.

Pivotally and slidably mounted on a square shaft 46 journalled between the inner plates 22 and 27 is a pressure roller carrying assembly, one for each chute 13 and 14. As these assemblies are similar, only that for the right-hand chute is shown in FIGURES 4 and 5. The assembly comprises a pair of side plates 47 and 48 spaced apart and secured together by pins 49, 50 and 50a and having a pressure roller 51 rotatably mounted on the pin 50a. The shaft 46 freely passes through round holes provided in lobes of the side plates. Between the plates 47 and 48 is an operating arm 52 slidably mounted on the shaft 46 but constrained to rotate therewith, the arm having a notch 53 engaging the pin 50. A spring 54 is connected between the pin 49 and the arm 52 so as to urge the side plates 47 and 48 clockwise as seen in FIGURE 4 to bring the pressure roller 51 into cooperation with its feed roller 44 (FIGURE 1) through an opening in the rear wall of its chute 13 or 14. However the pressure roller 51 is normally held out of cooperation with the feed roller 44 through the shaft 46 being held in a counter-clockwise position so that the lower edge of the notch 53 engages with and presses the pin 50 upwardly.

Secured to the spigoted extreme left-hand end of the square shaft 46, intermediate the plates 21 and 22 (FIGURE 2), is a lever arm 55 connected by a link 56 to an operating arm 57 fast on a shaft 58 of a rotary solenoid 59 of known kind. Upon energization of the solenoid 59 its shaft 58 will be rocked counter-clockwise as seen in FIGURE 2 which, through arm 57, link 56 and lever arm 55, rocks the square shaft 46 clockwise as seen in FIGURES 2 and 4 to lower the arm 52 and to permit the side plates 47 and 48 to rock clockwise under influence of the spring 54 to bring the pressure rollers 51 into engagement with the feed rollers 44.

Secured in the side plate 48 (FIGURE 5) of the pressure roller assembly associated with the right-hand chute 14 is a stud 60 overlying a tail of a card stop member 61. The member 61 is mounted for rocking and downward movements by a notch 62 thereof engaging a stud 63 mounted in a bracket 64 secured to the rear wall of the chute 14. A wire spring 65 connected between the tail of the member 61 and the stud 63 normally maintains the tail in engagement with the stud 60 which, with the side plate 48 in its normal clockwise position, permits a foot 66 of the member 61 normally to project through a rectangular slot in the rear wall of the chute 14 so as to be in the path of an inserted account card.

A wire link 67 couples the member 61 and one arm of a bell crank 68, the other arm of the bell crank 68 contacting a pivotally mounted operating arm 69 which cooperates with the plunger of a micro-switch CS1a, referred to later in connection with FIGURE 14.

Free on the shaft 58 (FIGURE 2) of the rotary solenoid 59 is another operating arm 70 having an upward projection which is urged into contact with a stud 71, extending laterally from the arm 57, by a spring 72 secured between the stud 71 and a pivot stud (not shown) connecting the lower end of the arm 70 to a link 73. The link 73 is pivotally connected, through a stud 76, to a lever arm 74 fast on the tenoned end of a square shaft 75. The stud 76 extends beneath a by-pass pawl 77 pivoted at 78 to the lower arm of a bell crank 79 pivoted to the plate 21 at 80. A bent-over lug of the by-pass pawl 77 is held in engagement with the lower arm of the bell crank 79 by a spring 81 extending between the lug and a stud 82 in the bell crank. The bell crank is held in engagement with a stop stud 83 secured in the plate 21 through cooperation of a roller 84 of insulating material, mounted on the upper arm of the bell crank 79, with a lower contact blade of a pair of normally open contacts LLS1a secured to, but insulated from, the plate 21 by a bracket 85.

The square shaft 75 (FIGURE 1) is journalled between the inner plates 22 and 27 and, to the rear of the chute 14, carries an arm 86 (FIGURES 4 and 5) which is slidable along but constrained to rotate with the shaft. The arm 86 has secured thereto studs 87 and 88. Pivoted on the stud 88 is an inverted L-shaped trigger arm 89 urged clockwise by a spring 90 coiled around the stud 88 and having its end engaging, respectively, the stud 87 and the downwardly extending branch of the arm 89. Eccentrically pivoted to the lower end of said branch of the arm 89 is a substantially triangularly shaped trigger pawl 91 provided with a pair of headed studs 92. A light spring 93, having one end anchored on the stud 87, passes behind the stud 88 and overlies the pair of studs 92 to maintain the pawl 91 in a normal relationship to the arm 89. A stud 94 extending laterally from the arm 89 underlies and holds the pawl 95 against counter-clockwise rotation on the stud 88, under the influence of a spring 96 secured between the pawl 95 and the chute 14, and out of the path of the abovementioned ratchet 45.

Free on the right-hand tenoned end of the square shaft 75 (FIGURE 3) is an arresting and aligning pawl 97 urged clockwise by a spring 98 secured between a stud 99 in the pawl and a stud 100 in the plate 26. A release arm 101 for the pawl 97 is secured to the spigoted end of the square shaft 75 and cooperates with the stud 99 so that, when the arm 101 is rocked counter-clockwise the pawl 97 is removed from engagement with the previously described aligning gear 39.

Mounted between the plates 25 and 26 is a rotary solenoid 102 (see also FIGURE 14) of known kind, shaft 103 of which extends through the plate 26 and has a crank arm 104 secured thereto. The crank arm 104 is connected by a link 105 to a lever arm 106 secured to the spigoted end of a punch operating shaft 107. The arm 106 is urged counter-clockwise by a spring 108 secured between the stud 100 and a pivot stud 109 in the arm, so as normally to maintain a punch arm 110 (FIGURES 1 and 5) against a stop stud 111 (FIGURE 5) secured in the chute 14. The punch arm 110 (FIGURE 1) is slotted at its lower end and engages in a notch in a punch 112 which punch projects rearwardly into a die block 113. The throw of the punch arm 110 is so adjusted that, when operated, the angular end of the punch 112 penetrates the die block 113 and an inserted account card to such an extent that only an indentation having a slight lip at its lower edge is formed on the account card.

The accounting machine itself is provided with power-operated mechanism for moving certain compression rollers (not shown) away from the platen 15 and for causing a front feed guide to be rocked and lowered away from the platen so as to allow an account card, or other desired record material, to be fed into the carriage from the front. This type of mechanism is commonly referred to as a "front feed mechanism," and only as much of such mechanism as is necessary to an understanding of the present invention is described herein.

A clutch mechanism is provided to connect the front feed mechanism to the power drive, and this mechanism will now be briefly described.

A shaft 114 (FIGURES 6, 12 and 13) is journalled in a bracket 115, secured to a casing (not shown) for the power drive mechanism, and has secured to its left-hand end a control plate 116 urged counter-clockwise as seen in FIGURE 6 by a spring 117 so as to bring one edge of a notch cut therein against a limit stud 118 mounted in the left-hand flange of the bracket 115. The plate 116 has pivotally mounted thereon a non-repeat pawl 119 which is urged by a spring 120 into engagement with a stud 121 mounted on a tripping arm 122 free on the shaft 114. The tripping arm 122 is provided with a finger 123 adapted to cooperate with either of two studs 124 or 125 (FIGURE 13) mounted on a clutch control arm 126. The arm 126 is secured on a sleeve 127 loosely journalled on a hub 128 free on a power driven shaft 140 and having secured to one end thereof a disc 129 (FIGURE 12) and to its other end a pair of companion cams 130 and 131. These cams cooperate with rollers on a lever 132 which is pivotally mounted on a shouldered screw 133 screwed into the machine casing. The disc 129 has passing therethrough a pin 134 to one end of which, on one side of the disc 129 is secured an arm 135 (FIGURE 13) provided with a notch which receives a stud 136 on the clutch control arm 126. The arm 135 is urged clockwise, as viewed in FIGURE 12, by a spring 137 stretched between the arm and a stud mounted on the disc 129. To the other end of the pin 134, on the opposite side of the disc 129 from the arm 135, is secured a sleeve 149 carrying a pawl 138 which cooperates with a ratchet 139 driven by the power-driven shaft 140. The disc 129 is provided with a pair of depressions 141 adapted to cooperate with a roller 142, mounted on an arm 143 pivotally supported on a rod 144 and urged toward the disc 129 by a spring 145. The disc 129 and the cams 130 and 131 have two home positions which are defined by the engagement of the roller 142 with one or other of the two depressions 141. In these positions, either the stud 124 or the stud 125 on the clutch control arm 126 bears against the end of the finger 123 (FIGURE 6), thereby holding the arm 135 in the position shown in FIGURE 13 against the urge of the spring 137.

A restoring lever 146 (FIGURES 6 and 12) is provided for restoring the finger 123 from an operated position to the position shown in FIGURE 13 even though the shaft 114 is retained in an operated position. The lever 146 is loosely pivoted on the shaft 114 and carries a stud 147 which engages a notch in the pawl 119. The lever 146 has a nose formed thereon adapted to engage a roller 148 secured to the disc 129 and to the sleeve 149 carrying the pawl 138 so as to cause the pawl 119 to be moved out of engagement with the stud 121 and thereby enable the tripping arm 122 to restore to the position shown in FIGURE 13 despite the shaft 114 and the control plate 116 being held in their operated positions.

The upper end of the lever 132 is pivotally connected to the forward end of a link 300, the rear end of which is pivotally connected to an arm 301 fast on the lower end of a vertical shaft 302 which, when rocked, effects the opening or the closing of the front feed throat in dependence upon the direction of such rocking. The mechanism for the opening and the closing of the throat is of well known type. Secured in the link 300 is a stud 303 which, by means of any suitable linkage 304 is connected to dashpot 305 controlling an insulated contact operating member (not shown) which, when the throat is moved from its open to its closed position caused normally open contacts DS2a, shown only in FIGURE 14, to close and then normally closed contacts DS1b to open. Upon return movement of the contact operating member, when the throat is moved from its closed to its open position, contacts DS1b are re-closed after a short time delay, and a longer time delay ensues before contacts DS2a are permitted to re-open due to the dashpot 305 controlling said return movement of the contact operating member.

The shaft 114 (FIGURE 6) is "split" as indicated at 162, and secured to the right-hand portion is an arm 150 having pivoted thereto a link 151 (see also FIGURE 10). A slot 152 in the rearward end of the link 151 is engaged by a roller 153 in the upper end of a lever 154 pivoted on a shouldered stud 155 secured in a plate 156 (see also FIGURE 11) secured to a bar 157 extending laterally across, and secured beneath, the rear of the accounting machine. The lever 154 is provided with a laterally extending lug 158 which, as shown in FIGURE 10, operates on the operating plungers of a pair of micro-switches TS1a and TS2b mounted on a plate 159 suitably secured to the plate 156.

A plate 306 (FIGURE 11) also secured to the bar 157 carries an auxiliary tripping rotary solenoid 209 for controlling the throat opening and closing clutch. A shaft 307 of the solenoid 209 has secured thereto a lever 308 having, in its lower end an operating stud 309 (see also FIGURE 10) contacting the right-hand edge of the lever 154.

A hooked arm 160, pivotally mounted on the link 151, normally retains the roller 153 in the left-hand end of the slot 152 through the action of a spring 161 tensioned between the arm 160 and the lever 154. To the left-hand portion of the shaft 114 is secured an arm 163 having one end of a link 164 pivoted thereto. The other end of the link 164 (FIGURES 10 and 11) is pivoted on a stud 165 secured in an arm 166 adjustably secured on shaft 167 of a rotary solenoid 168 (see also FIGURE 14). Also adjustably secured to the shaft 167 is an arm 169 extending forwardly over a nose on the arm 160.

Pivotally mounted on a shouldered stud 170, fixed in the plate 156, is a latch lever 171 urged clockwise by a spring 172 secured between a stud in the lever 171 and a stud in the plate 156, to hold the upper end of said lever against the stud 165. The lower end of the lever 171 is provided with a hook 173 adapted to engage a lug 174 of the lever 154 so as to retain the lug 158 of the latter in a position in which the micro-switch TS1a is closed and the micro-switch TS2b changed over.

Secured to the right-hand end of the shaft 114 (FIGURES 6 and 7) is an arm 175 having pivoted thereon a clevis 176. A wire link 177 extends between the clevis 176 and an ear 178 on a pivotally mounted lever 179 adapted to be rocked counter-clockwise upon depression of a usual "Carriage Throat" key (not shown) of the accounting machine. A further wire link 180 extends between an upper ear 181 of the lever 179 and a clevis 182 pivoted on a rearwardly extending arm of a sensing lever 183. The sensing lever 183 is urged counterclockwise by a spring 184 to tend to raise the wire link 177 and rock the arm 175 counter-clockwise as seen in FIGURE 7 and clockwise as seen in FIGURE 6, but such movement is normally obstructed by a finger 185 of the lever 183 engaging a shoulder 186 on a slidably mounted carriage throat control slide 187. The slide 187 is permitted to move forward under the influence of a spring 188 during a cycle of operation of the accounting machine to position a shoulder 189 beneath the finger 185, but such forward movement can be prevented either under control of a motor bar (not shown) or under control of a machine function control stop (not shown) mounted on the travelling record material carriage. The slide 187 is controlled in well known manner and is therefore not explained herein. Journalled in the bracket 115 (FIGURE 6) and also in another bracket (not shown) is a carriage throat interlock shaft 190 which has secured to its left-hand end a control arm 191 (FIGURE 8) which engages against the periphery of the lower roller on the lever 132. Also secured to the shaft 190 near its right-hand end is an arm 192 (FIGURE 9) which is urged counter-clockwise by a spring 193. Loosely journalled on the shaft 190 adjacent the arm 192 is a blocking arm 194 which is urged by a spring 195 into engagement with a stud 196 carried by the arm 192. When the carriage throat is closed the parts occupy the positions shown in FIGURES 8 and 9, whereas, when the throat is open the control arm 191 is permitted to move counter-clockwise and thereby rotate the shaft 190 so as to move the blocking arm to the positions shown in dot-and-dash lines in FIGURE 9. In this position the blocking arm 194 lies beneath a lever 197 which, when obstructed against clockwise movement, prevents engagement of a clutch (not shown) for the accounting machine drive.

Also secured to the shaft 190 (FIGURE 6) is an arm 198 having pivoted thereto one end of a link 199. The other end of the link 199 is pivoted to an actuator 200 (FIGURE 10) having a bail 201 extending across the plungers of three micro-switches CCS1a, CCS2a, and CCS3a (FIGURE 11) secured to the plate 156. Thus, when the shaft 190 is positioned as in FIGURE 8 when the throat is closed, the micro-switches CCS1–3a will be closed, and when the shaft is rocked counter-clockwise as seen in FIGURE 8 (clockwise as seen in FIGURE 6) to open the throat the micro-switches will be opened.

The electrical control components, represented between the dot-and-dash lines of FIGURE 14 are mounted directly on, or on brackets attached to, the bar 157 (FIGURES 10 and 11), and include a step-down mains transformer 202 having its input connected, through a fuse 203 and a mains switch, to the power supply for the accounting machine, and its output connected to the input of a full-wave rectifier 204. The positive terminal of the rectifier output is connected over a fuse 205 to a conductor 206. A manually operable switch 207, mounted at any convenient position on the accounting machine, is provided for disabling automatic feed-in of an account card. The moving contact of the switch is connected to a line 208 and thence over the solenoid 209, the microswitch CS1a, a return conductor 210, a manually operable switch 211 in its lower automatic line feed position, a fuse 212, to the negative output terminal of the rectifier. The switch 211 has two other positions in one R of which the throat can be opened and the inserted card removed without being indented in the event of the wrong card having been inserted, and in the other N of which the accounting machine can be used for normal front feed insertion. A relay R is provided having two normally open contacts R3a and R4a and two change-over contacts R1b and R2b, the operation of which will be apparent from the following description of the operation of the line-finding attachment and its electrical circuitry.

*Operation*

An account card is first inserted into the chutes 13 and 14 with the accounting machine front feed throat in open position and the switches 207 and 211 in the positions shown in FIGURE 14. The account card 9 encounters the foot 66 (FIGURE 5) of the member 61, and when given a slight additional downward movement, lowers the member 61 which, through the wire link 67, the bell crank 68 and the operating arm 69, closes the micro-switch CS1a to establish a circuit thereover from the positive potential supply conductor 206 (FIGURE 14), the line 208, solenoid 209, conductor 210 and switch 211 to the negative potential supply. The solenoid 209 energizes to rotate its armature which through the stud 309 (FIGURE 10) rocks the lever 154 from its normal dot-and-dash line to the position represented in full lines simultaneously to close the micro-switch TS1a and to change over the micro-switch TS2b. Immediately the lug 174 moves upwardly above the hook 173, and the latch lever 171 snaps thereover under the urge of its spring 172. The roller 153, during its leftward movement, also moves the link 151 forwardly to rock the right-hand portion of the shaft 114 clockwise as seen in FIGURE 6 and counter-clockwise as seen in FIGURE 7, this movement of the said shaft being permitted by the sliding of the upper end of the wire link 177 through the ear 178.

Closure of the micro-switch TS1a establishes a circuit from the conductor 206 over lines 213, 214 and 215, through the solenoid 59, to conductor 210 to energize the solenoid 59. The shaft 58 (FIGURE 2) of the solenoid 59 rotates counter-clockwise which, through the arm 57, the link 56, and the arm 55, rocks the square shaft 46 clockwise as seen in FIGURE 4. Clockwise rocking of the shaft 46 correspondingly rocks the arm 52, and its companion associated with the chute 13, to move the pressure rollers 51 into contact with the feed rollers 44 (FIGURE 1), which movement, through the stud 60 (FIGURE 5) rotates the member 61 clockwise to remove the foot 66 from the path of the inserted card and restores the linkage 68, 67, 69, to open the micro-switch CS1a and thus de-energize the solenoid 209. Counter-clockwise rotation of the arm 57 (FIGURE 2) through the spring 72, also rotates the arm 70 which, through the link 73 and the arm 74, rocks the square shaft 75 clockwise as seen in FIGURES 2 and 4, and similarly rocks the arm 86 and the trigger arm 89 to position the nose of the trigger pawl 91 against the inserted account card, and to move the pawl 95 out of the path of the ratchet 45. During clockwise (FIGURE 2) movement of the arm 74, the pivot stud 76 rocks the by-pass pawl 77 counter-clockwise, which movement has no effect on the bell crank 79. Referring to FIGURE 3, the shaft 75 will move counter-clockwise and imparts a similar movement to the release arm 101 which, through its cooperation with the stud 99 in the pawl 97, removes the nose of the latter from the gear 39 fast on the square shaft 40. Closure of the contact TS1a (FIGURES 10, 11 and 14) also completes a circuit over lines 213 and 214, contact R2b, line 218, motor 30, line 219, contact R1b, line 220, conductor 210, switch 211 to negative, thereby causing the shaft 31 (FIGURE 3) to rotate the pinion 35 counter-clockwise through the slipping clutch as previously described. Counter-clockwise rotation of the pinion 35, through the gear 36, similarly rotates the pinion 38 and the square shaft 40, thereby to cause the feed rollers 44 to feed the inserted account card into the open throat of the accounting machine.

Change-over of the micro-switch TS2b prepares a circuit for the solenoid 168 over lines 216 and 217, but said circuit is not completed to conductor 210 at this time as the contact LLS1a has not been closed.

The account card is fed into the open throat of the accounting machine until a prior indented lip thereon engages the trigger pawl 91 (FIGURE 4), which through the trigger arm 89, imparts a slight counter-clockwise movement to the latter whereby the stud 94 moves downwardly and permits the drive pawl 95 to descend and engage with the drive ratchet 45 under the influence of the spring 96. Upon engagement of a tooth of the ratchet 45 with the pawl 95, the latter is driven rearwardly and incidentally, slightly counter-clockwise about the stud 88, which rotates the arm 86 and the square shaft 75 counter-clockwise as seen in FIGURES 2 and 4 and clockwise as seen in FIGURE 3. Referring to FIGURE 2, the arm 74 is rocked counter-clockwise which, through the link 73, rocks the arm 70 clockwise away from the stud 71 in the arm 57, this movement being against the urge of the spring 72. During counter-clockwise movement of the arm 74 its stud engages the by-pass pawl 77 and, through the ear of the latter rocks the bell crank 79 clockwise to close the contact LLS1a and then rides past the by-pass pawl to permit the contact LLS1a to re-open. Referring to FIGURE 3, clockwise movement of the shaft 75 imparts similar movement to the arm 101 which permits the pawl 97, under the action of the spring 98, to re-engage the gear 39 and positively to stop rotation of the shaft 40 and the feed rollers 44. Rotation of the pinion 38 secured to the gear 39, of the gear 36 and of the pinion 35 is also arrested, the clutch (not shown) between the shaft 31 of the motor 30 and the pinion 35 being caused to slip.

Closure of the contact LLS1a (FIGURE 14) completes the previously prepared circuit, over micro-switch TS2b, for the solenoid 168 (see also FIGURE 11), and the solenoid energizes to rotate the shaft 167 (FIGURE 10) and the arm 166 counter-clockwise. The stud 165 in the arm 166 rocks the latch lever 171 counter-clockwise to the dot-and-dash line position and releases the lever 154 which returns to its normal dot-and-dash line position under the influence of a spring (not shown) which urges the plunger of the micro-switch TS1a upwardly, the arm 160 having been lowered, to move its hook out of the path of the roller 153, by the arm 169 upon counter-clockwise movement of the shaft 167. The lug 158 releases the micro-switches TS1a and TS2b which restore and open the circuits for the solenoid 59, the motor 30 and the solenoid 168. The restoration of the solenoid 59 restores the linkage 55 and 56 and the shaft 46 to move the pressure rollers 51 from cooperation with the feed rollers 44, and the motor 30 is brought to rest.

The control exercised on the front feed throat with reference to FIGURES 6 to 13 will now be explained. Upon energization of the solenoid 168 the stud 165 (FIGURE 10) moves the link 164 forwardly and, through the arm 163, rotates the left-hand portion of the shaft 114 clockwise as seen in FIGURE 6, thereby similarly to rotate the control plate 116. The pawl 119 on the plate 116 moves the tripping arm 122 clockwise through its cooperation with the stud 121, the finger 123 of the arm being thereby lowered out of contact with the stud 124 or 125 (FIGURE 13) with which it was in contact. The clutch control arm is now rocked counter-clockwise by the arm 135 under the urge of the spring 137, which movement of the arm, through the sleeve 149, lowers the pawl 138 into cooperation with the continuously driven ratchet 139 on the driving shaft 140 and causes the disc 129 and the cams 130 and 131 to be rotated counter-clockwise as viewed in FIGURE 12. The pawl 119 (FIGURE 6), through its notch engaging the stud 147 in the restoring lever 146, rocks the latter clockwise (as seen in FIGURE 6) and counter-clockwise as seen in FIGURE 12 into the path of the roller 148 (or the sleeve 149) which latter restores the pawl 119, the plate 116, and the shaft 114 to normal since, by this time, the solenoid 168 has been de-energized, thereby to permit the spring 120 to restore the tripping arm 122 to its normal position. When the stud 125 or 124 (FIGURE 12) strikes against the end of the finger 123 the arm 135 will be rocked counter-clockwise to disengage the pawl 138 from the ratchet 139, and the roller 142, engaging one of the depressions 141, will hold the disc 129, the cam 130, and 131, the arm 135 and the clutch control arm 126 in their rest positions as shown in FIGURES 12 and 13.

On the rotation of the disc 129 the throat-operating cams 130 and 131 will be rotated through an angle somewhat less than 180 degrees, in which position they will remain until the shaft is again operated. On the next operation of the shaft 114, the cams will be rotated through an angle somewhat greater than 180 degrees, so as to bring the stud 124 again into engagement with the end of the finger 123. FIGURES 12 and 13 show the parts in the positions which they assume after the throat has been closed, thus, on movement of the cams 130 and 131 from the open throat to closed throat positions the lever 132 will be rocked counter-clockwise to pull the link 300 forwardly.

Forward movement of the link 300, through suitable mechanism connected to the arm 301 and the shaft 302 positively closes the accounting machine front feed throat and, through link 304, connected to the stud 303 and the dashpot 305, closes contacts DS2a and opens contacts DS1b (FIGURE 14), the former preparing a holding circuit for relay R. The contacts DS1b and DS2a are delayed only during their release, by the previously mentioned dashpot.

Counter-clockwise movement of the lever 132 to the position shown in FIGURE 8 rocks the shaft 190 clockwise, which movement, as shown in FIGURE 9, through the spring 195 moves the blocking arm 194 to its full line position in which the main clutch for the accounting machine is free to be engaged. Referring to FIGURE 6, counter-clockwise movement of the shaft 190 (clockwise as seen in FIGURE 8), through the arm 198, moves the link 199 (see also FIGURE 10) to the rear, which movement closes the micro-switches CCS1a to CCS3a (see also FIGURE 14).

The account card has now been fed into the accounting machine to the next line to receive an imprint, the accounting machine throat closed to grip the card, and the machine freed to enable the operator to make a further entry or entries on the card.

During the last period of the operating cycle of the accounting machine, as determined by the extent of depression of a motor bar or by a function control stop carried by the travelling carriage, the slide 187 (FIGURE 7) is permitted to move forwardly to remove the shoulder 186 from, and insert the shoulder 189 beneath, the finger 185 of the sensing lever 183, thus allowing the latter to be rocked counter-clockwise by its spring 184. Counter-clockwise rocking of the lever 183 raises the wire links 180 and 177 to rock the arm 175 and the right-hand portion of the shaft 114 counter-clockwise (clockwise as seen in FIGURE 6) again to trip the throat operating clutch for a throat opening cycle as previously explained in connection with the closing of the throat. The link 151 (FIGURE 6) is pulled forwardly by the arm 150 again to close the micro-switch TS1a and change-over the micro-switch TS2b (FIGURES 10, 11 and 14), the micro-switches again being latched in said positions.

Closure of the micro-switch TS1a establishes a circuit over conductor 206, line 213, closed contacts CCS3a, line 221, solenoid 102, to conductor 210, and energizes the solenoid. The solenoid 102 (FIGURE 3) rotates its armature counter-clockwise which, through the arm 104, link 105, arm 106, and the square shaft 107, rocks the punch arm 110 (FIGURE 5) away from the stop stud 111 to cause the punch 112 (FIGURE 1) to indent and form an ear in the account card adjacent the last entered data. Closure of the micro-switch TS1a also establishes a circuit from the conductor 206, over line 213, closed contact CCS1a, line 222, through the relay R, over line 223 to conductor 210, thereby to energize the relay R which locks over contact R4a, and closure of the micro-switch TS1a re-closes the circuit for the solenoid 59 which locks over contact R3a to cause the pressure rollers to cooperate with the feed rollers and to remove the pawl 97 from the gear 39 in the manner previously explained.

Change over of the micro-switch TS2b energizes the solenoid 168 over line 216, line 217, closed contact CCS2a to release the mechanical latch for the micro-switches TS1a and TS2b which return to their normal positions, and the opening of the accounting machine front feed throat is effected as previously described. Upon the throat opening the micro-switches CCS1a to CCS3a are opened to open the circuits to the punch operating solenoid 102 and to the solenoid 168.

After a small time delay, due to the action of the dashpot controlling return movement of the DS switches upon movement of the throat from closed to open position, the switch DS1b closes to establish a reverse circuit to the electric motor 30 over micro-switch TS2b, contacts R1b, line 219, line 218, contacts R2b and line 220 to conductor 210. The motor 30 thus feeds the account card in reverse direction until the switch DS2a opens after its delay period to break the holding circuit for the relay R which releases to break the circuits for the motor 30 and the solenoid 59. Although the switch LLS1a will be closed during the restoration of the solenoid 59, this temporary closure will be without effect as both micro-switches CCS2a and TS2b are open at this time.

The line-finding attachment is thus ready for the next line finding operation, and the accounting machine locked against use until the throat thereof has again been closed.

If the manual switch 207 (FIGURE 14) is moved to its "off" position, the automatic feed of the account card upon the closure of the switch CS1a is disabled, thereby permitting the machine operator to initiate a feed-in cycle under motor bar control, the reverse feed at the conclusion of the data entry being as previously described.

Should the machine operator insert an incorrect account card the latter can be released and manually removed from the throat of the accounting machine without receiving an indentation by movement of the manual switch 211 to the reject position R, which opens a point in the operating circuit for the punch operating solenoid 102 and the card may be released for removal by the operation of the "Carriage Throat" key. Movement of the switch 211 to the normal position N permits normal operation of the front feed throat of the accounting machine, when the line-finding attachment is removed, by the clockwise rocking of the right-hand portion of the shaft 114 (FIGURE 6) causing the link 151 to be pulled forwardly to close the micro-switch TS1a and change-over the micro-switch TS2b, as described previously in connection with the opening of the throat. Change-over of the micro-switch TS2b establishes a circuit from conductor 206, through the solenoid 168, over lines 216 and 217, and switch 211 to negative, which energizes the solenoid 168 to rock the left-hand portion of the shaft 114 and operate the front feed throat clutch as has been previously described.

What is claimed is:

1. In a line-finding mechanism for an accounting or like machine, said machine constructed and arranged to perform operations in which records are made on a predetermined line of insertable record material, the combination of means functioning near the end of a recording operation to form a line-finding mark on the record material corresponding to the next available line thereon; means to feed the record material; means to drive the feeding means; arresting means for the driving means; control means for the arresting means; a rockable arm mounted on the control means; an element for sensing the last line-finding mark on the record material, said element mounted on the arm; a driving ratchet mounted on the feeding means; a driving pawl mounted on the control means and yieldingly engageable with the driving ratchet; and a projection on the arm normally holding the pawl out of engagement with the ratchet, whereupon engagement of the last line-finding mark with the sensing element rocks the arm to withdraw the projection from the pawl to engage said pawl with the member to cause said member to drive the control means to in turn render the arresting means effective, to positively arrest the feeding means when the line corresponding to the last line-finding mark on the record material is in record-receiving position.

2. In a line-finding mechanism for an accounting or similar machine, said machine constructed and arranged to perform operations in which records are made on predetermined lines of insertable record material, the combination of means functioning near the end of a recording operation to form a line-finding mark on the record material corresponding to the next available line thereon; means to feed the record material; means to drive the feeding means; an arresting disc mounted on the feeding means; a control shaft; an arresting pawl free on the control shaft; a release arm for the arresting pawl, said arm secured on the control shaft; an operating arm mounted on the control shaft to rotate therewith; a sensing arm pivotally mounted on the operating arm; a mark-sensing element mounted on the sensing arm; a driving member mounted on the feeding means; a control shaft driving pawl mounted on the operating arm and yieldingly urged to engage the driving member; and a projection on the sensing arm normally effective to hold the driving pawl out of engagement with the driving member, whereupon engagement of the last line-finding mark with the mark-sensing element rocks said element and the sensing arm to withdraw the projection from the driving pawl to engage said pawl with the driving member to cause it to rock the control shaft, the release arm, and the operating arm to engage the arresting pawl with the disc and to withdraw the sensing element from the line-finding mark on the record material, to positively arrest feeding movement of the feeding means and thereby accurately locate the next available line on the record material in record-receiving position.

3. In a line-finding mechanism for an accounting or similar machine, said machine constructed and arranged to perform operations in which records are made in sequential order on the lines of record material, the combination of means functioning near the end of a recording operation to form a line-finding mark on the record material corresponding to the next available line thereon; means including a trigger device to sense the last line-finding mark on the record material; means to feed the record material; means normally effective to arrest operation of the feeding means; a receptacle to guide the record material to the feeding means; means rendered effective by insertion of the record material into the receptacle to render the arresting means ineffective, move the trigger device into sensing relationship with the line-finding marks on the record material and activate the feeding means; and means rendered effective by the trigger device when it senses and is engaged by the last mark on the record material and operated by the feeding means, to restore the arresting means to arresting position to positively terminate feeding movement of the record material when the next available line thereon is in record-receiving position.

4. In a line-finding mechanism for an accounting or similar machine, said machine constructed and arranged to perform operations in which records are made on insertable record material, the combination of means functioning near the end of recording operations to form a line-finding mark on the record material corresponding to the next available line thereon; non-positive means to feed the record material to record-receiving position; a receptacle to receive and guide the record material to the feeding means; normally effective means to arrest the feeding means against operation; normally ineffective means to sense the line-finding marks; means operable in one direction to render the arresting means ineffective, to render the sensing means effective, and to activate the feeding means, said operating means restorable in the opposite direction; and means to connect the operable means to the feeding means for operation thereby, said connecting means normally retained in ineffective position by the sensing means and moved to effective position when said sensing means is engaged by the last line-finding mark, to cause the feeding means to restore the operating means in said opposite direction to restore the arresting means to effective position, to restore the sensing means to ineffective position, and to deactivate the feeding means, to positively terminate feeding movement of the record material when the next available line thereon is in record-receiving position.

5. In a line-finding mechanism for an accounting or similar machine, said machine constructed and arranged to perform operations in which records are made in sequential order on the next available line of insertable record material, the combination of means functioning near the end of a recording operation to form a line-finding mark on the record material corresponding to the next available line thereon; non-positive means to feed the record material to record-receiving position; normally ineffective pressure means to hold the record material in yielding engagement with the feeding means; a receptacle to receive and guide the record material between the feeding means and the pressure means; means normally effective to arrest the feeding means against feeding movement; means to control the operation of the arresting means; means including an arm mounted on the control means and a sensing pawl mounted on the arm to sense for the last line-finding mark on the record material; means to drive the control means in one direction to move the pawl into sensing relationship with the line-finding mark, to release the arresting means, and to activate the feeding means, said driving means also effective to render the pressure means effective; a drive member mounted on the feeding means; a drive pawl mounted on the control means and yieldingly urged into engagement with the drive member; means on the sensing means to retain the drive pawl out of engagement with the drive member when said sensing means is in sensing position, said means effective when the sensing pawl is engaged by the last line-finding mark and moved thereby independently of the control means, to engage the drive pawl with the drive member to drive said control means in the opposite direction to restore the arresting means to effective position, to restore the sensing means to ineffective position, and to deactivate the feeding means to terminate feeding movement of the record material when the next available line thereon is in record-receiving position.

References Cited in the file of this patent

UNITED STATES PATENTS 2,831,560  Oberholzer et al. _____ Apr. 22, 1958